US011203494B2

(12) United States Patent
Sun et al.

(10) Patent No.: US 11,203,494 B2
(45) Date of Patent: Dec. 21, 2021

(54) SYSTEM AND METHOD FOR SORTING MOVING OBJECTS

(71) Applicant: Kapito Inc., Hsinchu (TW)

(72) Inventors: Feng-Tso Sun, Hsinchu (TW); Yi-Ting Yeh, Hsinchu (TW); Feng-Yu Sun, Hsinchu (TW); Hui-Pu Chang, Hsinchu (TW)

(73) Assignee: KAPITO INC., Hsinchu (TW)

( * ) Notice: Subject to any disclaimer, the term of this patent is extended or adjusted under 35 U.S.C. 154(b) by 0 days.

(21) Appl. No.: 16/937,562

(22) Filed: Jul. 23, 2020

(65) Prior Publication Data

US 2021/0024297 A1   Jan. 28, 2021

(30) Foreign Application Priority Data

Jul. 24, 2019   (TW) .................................. 108126173

(51) Int. Cl.
 *B65G 47/42* (2006.01)
 *B65G 47/90* (2006.01)
 *B65G 47/49* (2006.01)

(52) U.S. Cl.
 CPC ........... *B65G 47/42* (2013.01); *B65G 47/493* (2013.01); *B65G 47/90* (2013.01); *B65G 2203/041* (2013.01)

(58) Field of Classification Search
 CPC ....... B65G 47/42; B65G 47/493; B65G 47/90
 See application file for complete search history.

(56) References Cited

U.S. PATENT DOCUMENTS

| 5,412,220 A * | 5/1995 | Moore ................. B65G 47/252 144/357 |
| 8,930,015 B2 * | 1/2015 | Johnston ................ B65G 47/46 700/223 |
| 9,492,848 B1 * | 11/2016 | Davis .................... B07C 5/3422 |
| 2011/0170998 A1 * | 7/2011 | Winkler ................ B65G 47/90 414/564 |

* cited by examiner

*Primary Examiner* — William R Harp
(74) *Attorney, Agent, or Firm* — Anova Law Group, PLLC

(57) ABSTRACT

A system for sorting moving objects is disclosed. The system comprises a light source, an image capturing device, a controlling and processing device, and an object sorting device. Particularly, the controlling and processing device is configured to decide a first setting parameter so as to apply a parameter adjustment to the light source, and is also configured to decide a second setting parameter so as to apply an parameter adjustment to the image capturing device. After deciding an object classifier based on the first setting parameter, the second setting parameter, and object images received from the image capturing device, the object sorting device is controlled to apply an object sorting process to the of objects that are delivered by the belt conveyor, thereby sorting the objects into at least two object group consisting of a normal object group and a defective object group.

5 Claims, 5 Drawing Sheets

SYSTEM AND METHOD FOR SORTING MOVING OBJECTS

BACKGROUND OF THE INVENTION

1. Field of the Invention

The present invention relates to the technology field of automatic product inspection systems, and more particularly to a system and method for sorting moving objects.

2. Description of the Prior Art

It is well known that, quality inspection is needed to be executed before parts are received and stored in warehouse or semi-finished products and/or goods are ready to be shipped out, so as to make sure that the parts, the semi-finished products and the goods all have a best quality. The quality inspection includes function test and appearance inspection. Function test machine is commonly adopted for applying a standard function testing process to test objects, thereby generating a standard testing report without any controversial issue. Therefore, according to the standard testing report, the test objects can be easily classified into a group of good product and another one group of defective product. On the contrary, however, results of appearance inspection are found to often induce controversial issue because of lacking standard judging rules.

Accordingly, there are some automatic object inspecting and sorting systems developed and proposed. For example, China Patent No. CN201394544Y discloses an equipment for sorting timber according to color and grain. The equipment comprises a belt conveyor, an image capturing device, a plurality of timber sorting devices and a control device. The image capturing device is mounted at a front side end of the belt conveyor, and the timber sorting devices are mounted on lateral side ends of the belt conveyor. By controlling the belt conveyor, the image capturing device and the timber sorting devices as well as referring to a sort parameter table, the control device is able to complete a sorting and ranking procedure of a plurality of timbers that are transported from the front side end of the belt conveyor to the rear side end of the belt conveyor.

On the other hand, China Patent No. CN101823057A discloses a rice color sorting system, which utilizes an image acquisition system to acquire a rice image from rice that is transmitted on a belt conveyor. Moreover, an image processing device is adopted for completing a rice color sorting procedure. In addition, China Patent No. CN101486033A discloses a system for sorting fruits and Chinese chestnut. The system comprises a belt conveyor, an image capturing device, a sorting device, and a control device. The control device control the image capturing device to collect images of fruits that are transported by the belt conveyor. By using a computer vision technology, the sorting device is configured to judge the comprehensive quality of the fruits according to the collected images.

From above descriptions, it can find that the conventional product inspecting and sorting systems all basically include a belt conveyor, an image capturing device and a sorting device. However, the key difference between the three conventional product inspecting and sorting systems is the inspecting and sorting rules. For example, the inspecting and sorting rules applied in the timber inspecting and sorting system that is disclosed by CN201394544Y include timber color, timber grain and timber stain, but CN101823057A and CN101486033A both only adopts color as the principal rule for sorting products. Therefore, in case of the inspecting and sorting rules being kept to be original, the timber inspecting and sorting system fails to complete a sorting procedure of rice or fruits that are transmitted on the belt conveyor. Of course, when the original inspecting and sorting rules are not changed, the rice (or fruits) sorting system are not suitable for achieving a sorting procedure of timbers that are transmitted on the belt conveyor.

From above descriptions, it is able to know that the conventional product inspecting and sorting systems are commonly designed to be a special purpose equipment, and cannot be applied to execute an automatic inspection and classification on any kinds of test objects. In conclusion, there is still room for improvement in the conventional product inspecting and sorting systems. In view of that, inventors of the present application have made great efforts to make inventive research and eventually provided a system and method for sorting moving objects.

SUMMARY OF THE INVENTION

The primary objective of the present invention is to disclose a system and method for sorting moving objects. The system comprises a light source, an image capturing device, a controlling and processing device, and an object sorting device. Particularly, the controlling and processing device is provided with a first parameter decision unit, a second parameter decision unit and a classifier decision unit. These three decision units are configured to automatically complete a self-learning and self-training task based on at least one first setting parameter, at least one second setting parameter, and a plurality of object images received from the image capturing device. As a result, the three decision units can adaptively decide a suitable first setting parameter, a suitable second setting parameter and a suitable object classifier. Therefore, the controlling and processing device completes a parameter adjustment of the light source according to the suitable first setting parameter, achieves a parameter adjustment of the image capturing device according to the suitable second setting parameter, and utilizes the object classifier to apply an object classification process to the object images, so as to generate a plurality of classified object images. Eventually, the object sorting device is controlled to apply an object sorting process to the objects that are delivered by the belt conveyor based on the plurality of classified object images, thereby sorting the plurality of objects into at least two object group consisting of a normal object group and a defective object group. Therefore, it is understood that, this moving objects sorting system can be applied to execute an automatic product inspecting and sorting procedure on any kinds of objects. For example, the objects can be agricultural products, mechanical parts, electronic elements/components, semi-finished products, or products.

In order to achieve the primary objective of the present invention, inventors of the present invention provides an embodiment of the system for sorting moving objects, comprising:

a light source, being disposed near a belt conveyor, so as to provide a light to illuminate a plurality of objects moving on the belt conveyor;

an image capturing device, being disposed near a belt conveyor and adjacent to the light source, so as to apply an image acquiring process to the plurality of objects that are illuminated by the light;

a controlling and processing device, being electrically connected to the light source and the image capturing device; and an object sorting device, being disposed near the belt conveyor, and being electrically connected to the controlling and processing device;

wherein the controlling and processing device comprises a microprocessor unit, an object image database, and a setting parameter database storing with a plurality of first setting parameters and a plurality of second setting parameters, and being configured to perform a plurality of functions consisting of:

(a) deciding and selecting at least one first setting parameter from the parameter database based on a plurality of object images received from the image capturing device and a plurality of reference object images accessed from the object image database, and then achieving a parameter adjustment of the light source based on the at least one first setting parameter, so as to make the light has a specific color and a specific intensity;

(b) deciding and selecting at least one second setting parameter from the parameter database based on the plurality of object images, and then completing a parameter adjustment of the image capturing device, so as to make the image capturing device apply the image acquiring process to the plurality of objects based on a specific focal length, a specific depth of focus, a specific exposure value (EV), a specific angle of view, and/or a specific angle of coverage;

(c) deciding an object classifier based on the at least one first setting parameter, the at least one second setting parameter, and the object images received from the image capturing device, thereby utilizing the object classifier to apply an object classification process to the object images, so as to generate a plurality of classified object images; and (d) controlling the object sorting device to apply an object sorting process to the plurality of objects that are delivered by the belt conveyor based on the plurality of classified object images, thereby sorting the plurality of objects into at least two object group consisting of a normal object group and a defective object group.

For achieving the primary objective of the present invention, inventors of the present invention also provides an embodiment of the method for sorting moving objects, being applied in an object sorting system comprising a belt conveyor, a light source, an image capturing device, a controlling and processing device, and an object sorting device, and comprising following steps:

(1) providing a microprocessor unit, a first parameter decision unit, a second parameter decision unit, a setting parameter database, an object image database, and an object classifier decision unit in the controlling and processing device;

(2) letting a plurality of objects be delivered on the belt conveyor, and utilizing the light source to provide a light for illuminating the plurality of objects;

(3) utilizing the image capturing device to apply an image acquiring process to the plurality of objects;

(3) utilizing the first parameter decision unit to decide and select at least one first setting parameter from the parameter database based on a plurality of object images received from the image capturing device and a plurality of reference object images accessed from the object image database, and then to achieve a parameter adjustment of the light source based on the at least one first setting parameter, so as to make the light has a specific color and a specific intensity;

(4) utilizing the second parameter decision unit to decide and select at least one second setting parameter from the parameter database based on the plurality of object images, and then to complete a parameter adjustment of the image capturing device, so as to make the image capturing device apply the image acquiring process to the plurality of objects based on a specific focal length, a specific depth of focus, a specific exposure value (EV), a specific angle of view, and/or a specific angle of coverage;

(5) utilizing the object classifier decision unit to decide an object classifier based on the at least one first setting parameter, the at least one second setting parameter, and the object images received from the image capturing device;

(6) utilizing the object classifier to apply an object classification process to the object images, so as to generate a plurality of classified object images; and (7) controlling the object sorting device to apply an object sorting process to the plurality of objects that are delivered by the belt conveyor according to the plurality of classified object images, thereby sorting the plurality of objects into at least two object group consisting of a normal object group and a defective object group.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a system and method for sorting moving objects disclosed by the present invention, embodiments of the present invention will be described in detail with reference to the attached drawings hereinafter.

Figure 1:
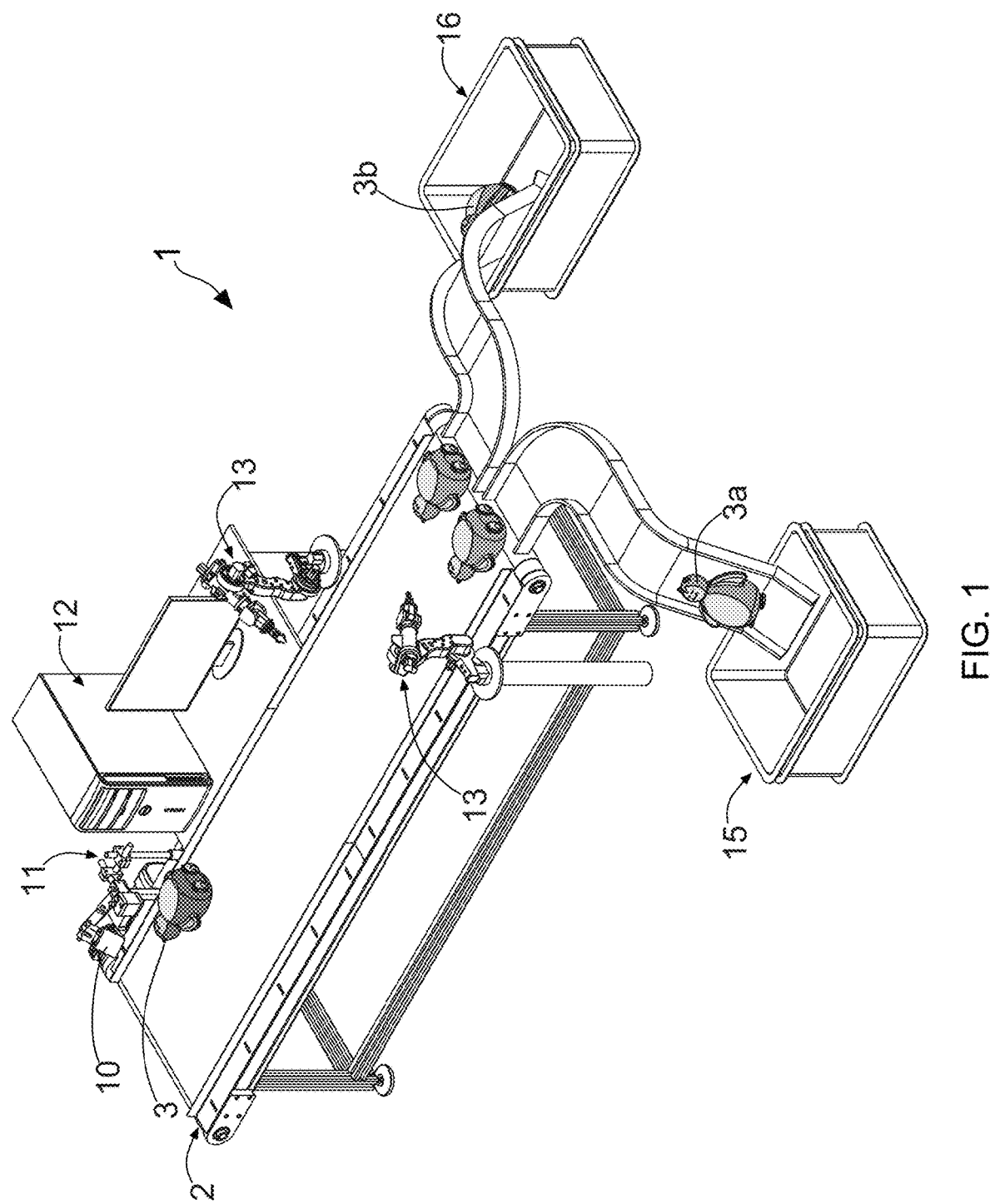
FIG. 1 shows a first stereo diagram of a system for sorting moving objects according to the present invention.
Figure 2:
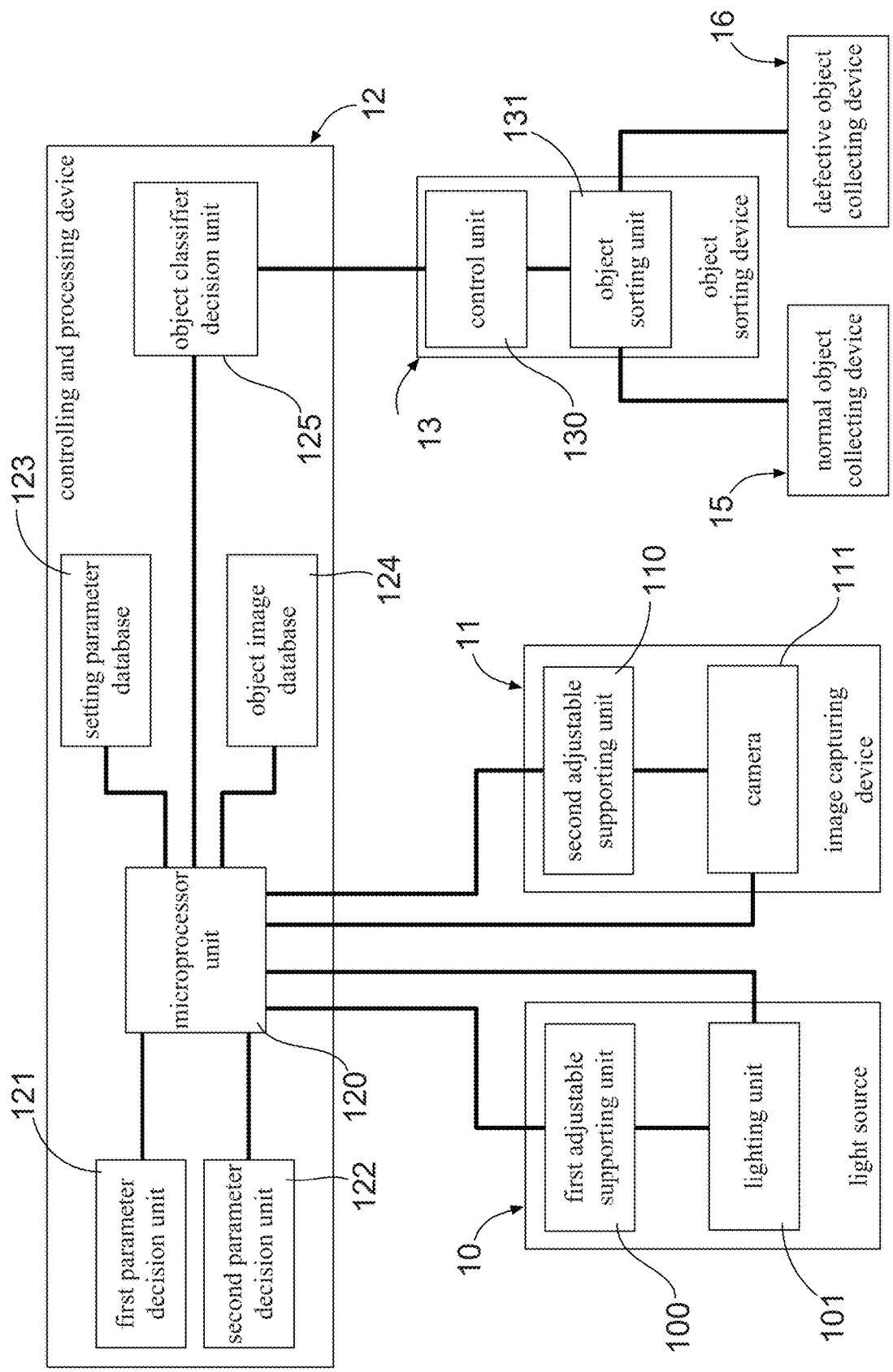
FIG. 2 shows a block diagram of a light source, an image capturing device, a controlling and processing device, and an object sorting device of the system for sorting moving objects.

With reference to FIG. 1, there is shown a schematic stereo diagram of a system for sorting moving objects according to the present invention. As FIG. 1 shows the system 1 for sorting moving objects comprises: a belt conveyor 2, a light source 10, an image capturing device 11, a controlling and processing device 12, and an object sorting device 13. FIG. 2 illustrates a block diagram of the light source 10, the image capturing device 11, the controlling and processing device 12, and the object sorting device 13. As described in more detail below, the light source 10 is disposed near a belt conveyor 2, so as to provide a light to illuminate a plurality of objects 3 moving on the belt conveyor 2. Moreover, the image capturing device 11 is disposed near the belt conveyor 2 and adjacent to the light source 10, so as to apply an image acquiring process to the plurality of objects 3 that are illuminated by the light.

According to the present invention, the light source 10 comprises a first adjustable supporting unit 100 and a lighting unit 101. The first adjustable supporting unit 100 is electrically connected to the controlling and processing device 12, and the lighting unit 101 is connected to the first adjustable supporting unit 100, and is also electrically connected to the controlling and processing device 12. On the other hand, the image capturing device 11 comprises a second adjustable supporting unit 110 and a camera 111. The second adjustable supporting unit 110 is electrically connected to the controlling and processing device 12, and the camera 111 is connected to the second adjustable supporting unit 110, and is also electrically connected to the controlling and processing device 12.

According to the present invention, the controlling and processing device 12 are particularly configured to include a first parameter decision unit 121, a second parameter decision unit 122, a setting parameter database 123, an object image database 124, and an object classifier decision unit 125. In one embodiment, the first parameter decision unit 121, the second parameter decision unit 122, and the object classifier decision unit 125 can be provided in the controlling and processing device 12 by a form of application program, library, variables, and/or operands. As FIG. 1 and FIG. 2 show, the first parameter decision unit 121 is configured for deciding and selecting at least one first setting parameter from the parameter database 123 based on a plurality of object images received from the image capturing device 11 and a plurality of reference object images accessed from the object image database 124. Therefore, the microprocessor unit 120 is able to achieve a parameter adjustment of the light source 10 based on the at least one first setting parameter, so as to make the light for illuminating the objects 3 has a specific color and a specific intensity. In some embodiment, after the parameter adjustment of the light source 10 is completed, the first adjustable supporting unit 100 may be also adjusted so as to make the lighting unit 101 provide the light to illuminate the plurality of objects 3 moving on the belt conveyor 2 by an illumination height and an illumination angle. Briefly speaking, the at least one first setting parameter decided by the first parameter decision unit 121 comprises light color, light intensity, illumination height of the lighting unit 101, and/or illumination angle the lighting unit 102.

On the other hand, the second parameter decision unit 122 is configured for deciding and selecting at least one second setting parameter from the parameter database 123 based on the plurality of object images. Therefore, the microprocessor unit 120 is able to complete a parameter adjustment of the image capturing device 11, so as to make the image capturing device 11 apply the image acquiring process to the plurality of objects 3 based on a specific focal length, a specific depth of focus, a specific exposure value (EV), a specific angle of view, and/or a specific angle of coverage. It should be understood that, after the parameter adjustment of the image capturing device 11 is completed, the second adjustable supporting unit 110 and the camera 111 being both adjusted so as to make the image capturing device 11 apply the image acquiring process to the plurality of objects 3 based on the specific focal length, the specific depth of focus, the specific exposure value (EV), the specific angle of view, and/or the specific angle of coverage. Briefly speaking, the at least one second setting parameter decided by the second parameter decision unit 122 comprises focal length, depth of focus, exposure value (EV), angle of view, and/or angle of coverage.

As FIG. 2 shows, the setting parameter database 123 is adopted for storing a plurality of first setting parameters and second setting parameters, and the object image database 124 is used for storing a plurality of reference object images and the object images transmitted from the camera 111. Moreover, in the present invention, the object classifier decision unit 125 is configured for deciding an object classifier based on the at least one suitable first setting parameter that is decided by the first parameter decision unit 121, at least one suitable second setting parameter that is decided by the second parameter decision unit 122, and the object images received from the image capturing device 11. In a practicable embodiment, the object classifier decision unit 125 decides the object classifier according to the sort of the object 3, so that the object classifier is selected from the group consisting of Bayesian classifier, classifier using neural networks classification, classifier using iterative self-organizing data analysis technique algorithm (ISODATA), classifier using K-means clustering algorithm, classifier using Gaussian maximum likelihood classification.

As FIG. 1 and FIG. 2 show, the object sorting device 13 comprises a control unit 130 and an object sorting unit 131. The control unit 130 is coupled to the controlling and processing device 12, and the object sorting unit 131 is controlled by the control unit 130. According to the present invention, after the object classifier is decided and then utilized to apply an object classification process to the object images, a plurality of classified object images are generated. Consequently, the microprocessor unit 120 is able to control the object sorting device 13 to apply an object sorting process to the plurality of objects 3 that are delivered by the belt conveyor 2 according to the plurality of classified object images, thereby sorting the plurality of objects 3 into at least two object group consisting of a normal object group and a defective object group. For example, the object sorting unit 131 is a robot arm, and is controlled by the control unit 130 so as to sort the plurality of objects 3 into a plurality of normal objects 3a and a plurality of defective objects 3b. As FIG. 1 shows, the plurality of normal objects 3a are eventually delivered into a normal object collecting device 15 that is disposed near an end side of the belt conveyor 2. Moreover, the plurality of defective objects 3b are consequently delivered into a defective object collecting device 16 that is disposed near an end side of the belt conveyor 2.

Figure 3:
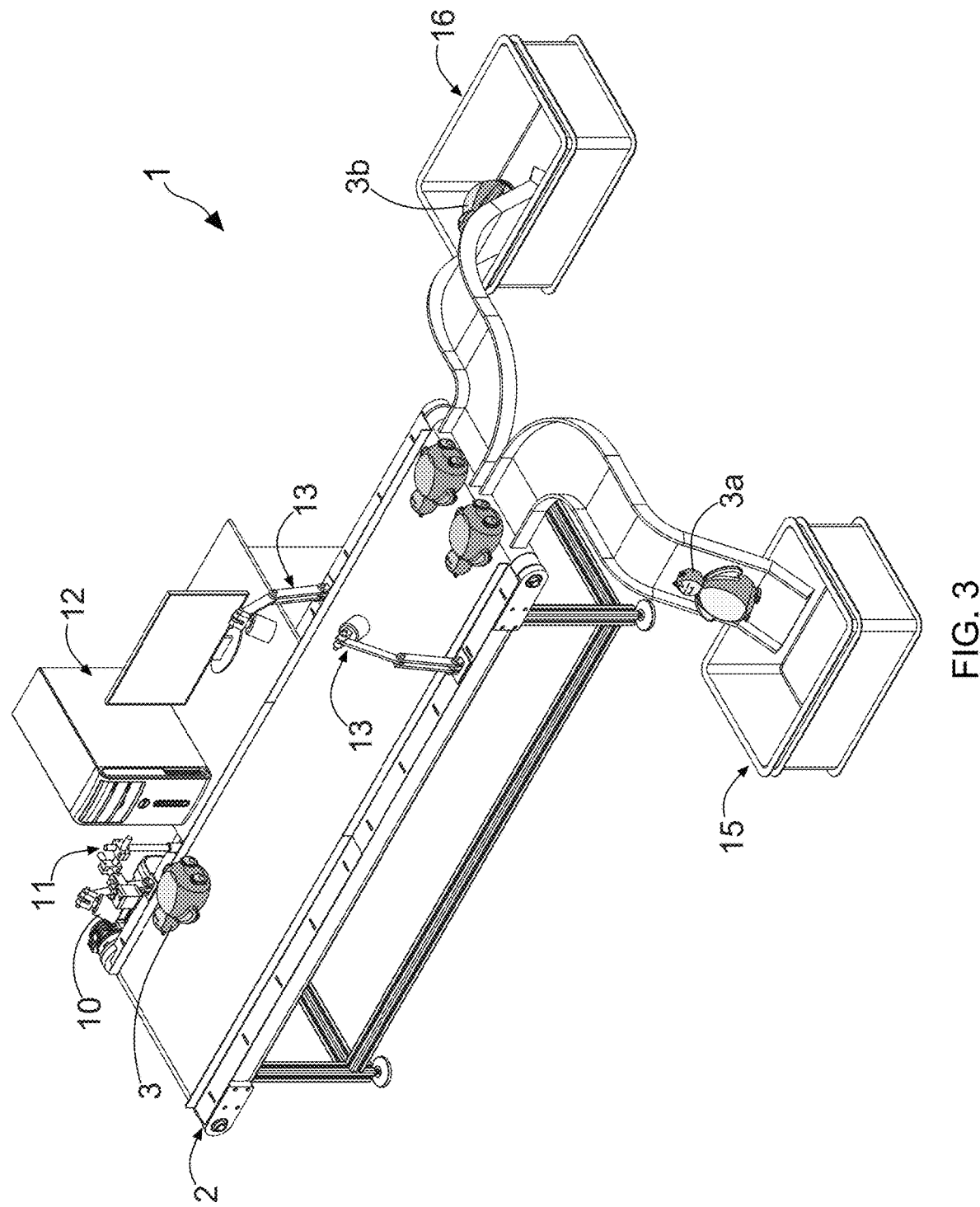
FIG. 3 shows a second stereo diagram of the system for sorting moving objects according to the present invention; and FIG. 4A

FIG. 3 shows a second stereo diagram of the system for sorting moving objects according to the present invention. It is worth explaining that, FIG. 1 depicts that the object sorting device 13 is a robot arm mechanism, but the robot arm mechanism is not a limited embodiment for the object sorting device 13. As FIG. 3 shows, in other practicable embodiment, the object sorting unit 131 can also be an object illuminator or a projector. When taking the object illuminator as the object sorting unit 131, the object illuminator can be controlled, by the control unit 130, to sort out a normal object by providing a first object sorting light to illuminate one of the objects that are delivered on the belt conveyor 2. Of course, the object illuminator can also be controlled, by the control unit 130, to sort out a defective object 3b by providing a second object sorting light to illuminate one of the objects that are delivered on the belt conveyor 2. As such, according to the first object sorting light and the second object sorting light, operation staffs can easily classified the objects on the belt conveyor 2 into a normal object group and a defective object group. On the other hand, when taking the projector as the object sorting unit 131, the projector can be controlled, by the control unit 130, to sort out a normal object by projecting a first object sorting indicator onto one of the objects that are delivered on the belt conveyor 2. Of course, the projector can also be controlled, by the control unit 130, to sort out a defective object 3b by projecting a second object sorting indicator onto one of the objects that are delivered on the belt conveyor 2. As such, according to the first object sorting indicator and the second object sorting indicator, operation staffs can easily classified the objects on the belt conveyor 2 into a normal object group and a defective object group.

Figure 4A:
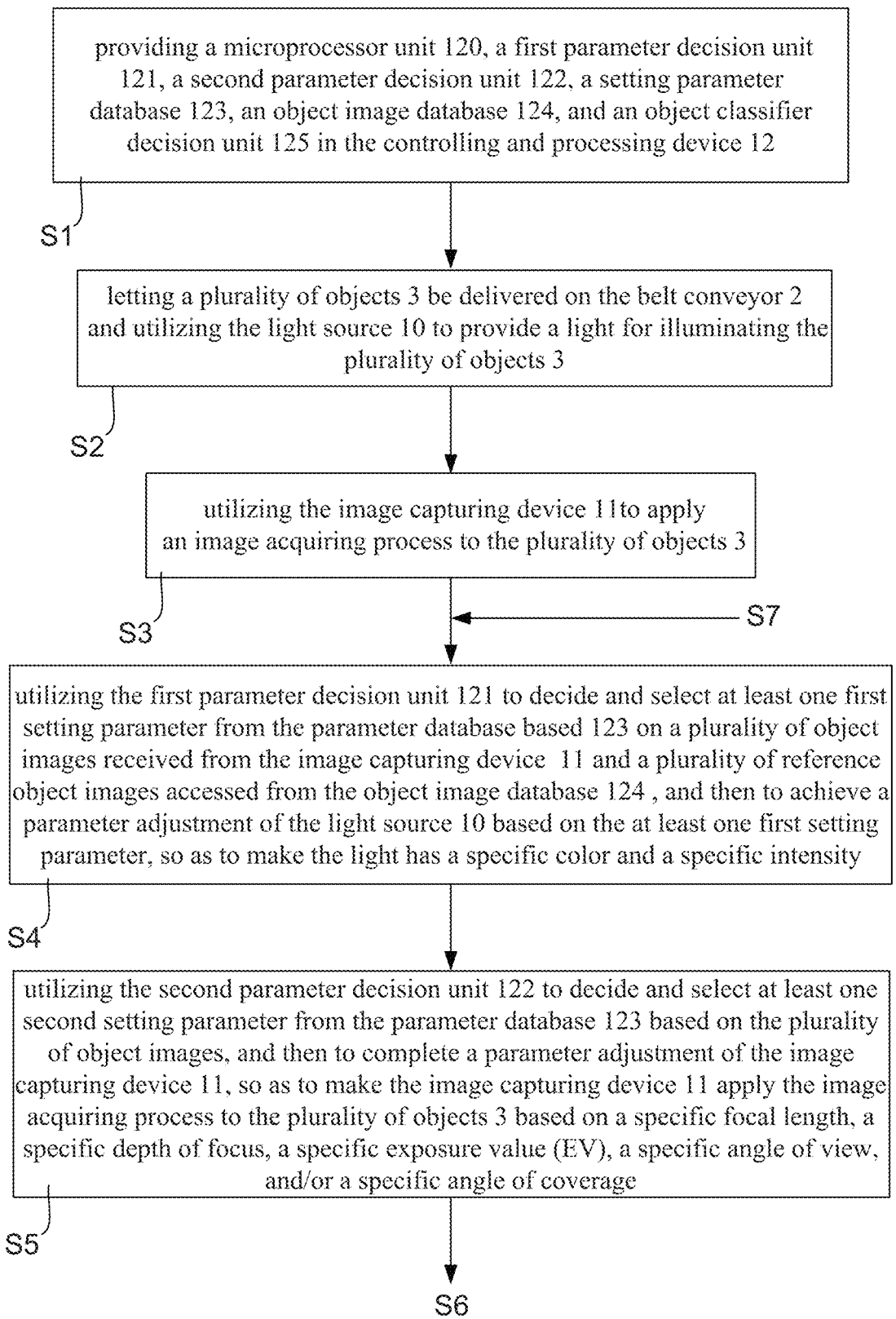
FIG. 4B shows flowchart diagrams of the method for sorting moving objects according to the present invention.
Figure 4B:
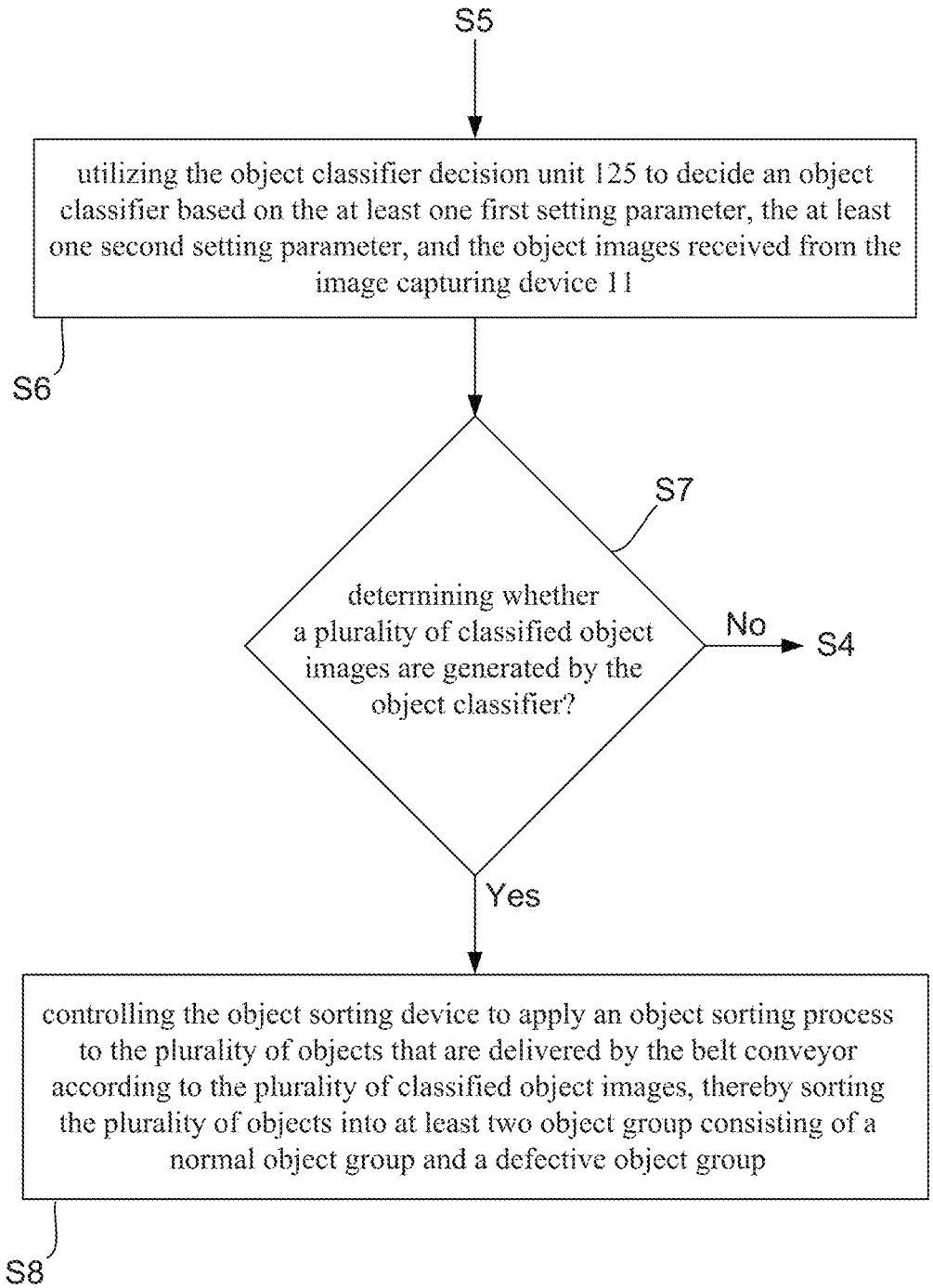

As such, above descriptions have introduced the system for sorting moving objects disclosed by the present invention. Furthermore, the present invention also discloses a method for sorting moving objects. FIG. 4A and FIG. 4B shows flowchart diagrams of the method for sorting moving objects according to the present invention. The method is applied in an object sorting system 1 (as shown in FIG. 1) comprising a belt conveyor 2, a light source 10, an image capturing device 11, a controlling and processing device 12, and an object sorting device 13, and mainly comprises 8 steps, and the method flow is firstly proceeded to step S1 for providing a microprocessor unit 120, a first parameter decision unit 121, a second parameter decision unit 122, a setting parameter database 123, an object image database 124, and an object classifier decision unit 125 in the controlling and processing device 12.

In step S2, it lets a plurality of objects be delivered on the belt conveyor 2, and utilizes the light source 10 to provide a light for illuminating the plurality of objects. Subsequently, the method flow is proceeded to step S3 for utilizing the image capturing device 11 to apply an image acquiring process to the plurality of objects 3. As described in more detail below, in step S3, it utilizes the first parameter decision unit 121 to decide and select at least one first setting parameter from the parameter database 123 based on a plurality of object images received from the image capturing device 11 and a plurality of reference object images accessed from the object image database 124, and then to achieve a parameter adjustment of the light source 10 based on the at least one first setting parameter, so as to make the light has a specific color and a specific intensity.

Subsequently, the method flow is proceeded to step S4, so as to utilize the second parameter decision unit 122 to decide and select at least one second setting parameter from the parameter database 123 based on the plurality of object images, and then to complete a parameter adjustment of the image capturing device 11. After that, it makes the image capturing device 11 apply the image acquiring process to the plurality of objects 3 based on a specific focal length, a specific depth of focus, a specific exposure value (EV), a specific angle of view, and/or a specific angle of coverage.

After the step S3 and the step S4 are both finished, the method flow is next proceeded to step S5 for utilizing the object classifier decision unit 125 to decide an object classifier based on the at least one first setting parameter, the at least one second setting parameter, and the object images received from the image capturing device 11. In a practicable embodiment, the object classifier decision unit 125 decides the object classifier according to the sort of the object 3, so that the object classifier is selected from the group consisting of Bayesian classifier, classifier using neural networks classification, classifier using iterative self-organizing data analysis technique algorithm (ISODATA), classifier using K-means clustering algorithm, classifier using Gaussian maximum likelihood classification.

Subsequently, the method flow is proceeded to step S6 for utilizing the object classifier to apply an object classification process to the object images 3, so as to generate a plurality of classified object images. In step S7 of the method flow, it determines whether a plurality of classified object images are generated by the object classifier or not. If yes, the method flow next proceeds to step S8; otherwise, the method flow proceeds back to step S4. In step S8, the object sorting device 13 is controlled, by the controlling and processing device 12, to apply an object sorting process to the plurality of objects 3 that are delivered by the belt conveyor 2 according to the plurality of classified object images, thereby sorting the plurality of objects 3 into at least two object group consisting of a normal object group and a defective object group.

For example, the object sorting device 13 is a robot arm mechanism, and is controlled by the controlling and processing device 12 so as to sort the plurality of objects 3 into a plurality of normal objects 3a and a plurality of defective objects 3b. As FIG. 1 shows, the plurality of normal objects 3a are eventually delivered into a normal object collecting device 15 that is disposed near an end side of the belt conveyor 2. Moreover, the plurality of defective objects 3b are consequently delivered into a defective object collecting device 16 that is disposed near an end side of the belt conveyor 2.

Therefore, through above descriptions, the system and method for sorting moving objects of the present invention have been introduced completely and clearly; in summary, the present invention includes the advantages of:

(1) The present invention discloses a system for sorting moving objects. The system 1 comprises a light source 10, an image capturing device 11, a controlling and processing device 12, and an object sorting device 13. Particularly, the controlling and processing device 12 is provided with a first parameter decision unit 121, a second parameter decision unit 122 and a classifier decision unit 125. These three decision units are configured to automatically complete a self-learning and self-training task based on at least one first setting parameter, at least one second setting parameter, and a plurality of object images received from the image capturing device 11. As a result, the three decision units can adaptively decide a suitable first setting parameter, a suitable second setting parameter and a suitable object classifier. Therefore, the controlling and processing device 12 completes a parameter adjustment of the light source 10 according to the suitable first setting parameter, achieves a parameter adjustment of the image capturing device 11 according to the suitable second setting parameter, and utilizes the object classifier to apply an object classification process to the object images for generating a plurality of classified object images. Eventually, the object sorting device 15 is controlled, by the controlling and processing device 12, to apply an object sorting process to the objects 3 that are delivered by the belt conveyor 2 based on the plurality of classified object images, thereby sorting the plurality of objects 3 into at least two object group consisting of a normal object group and a defective object group.

(2) Therefore, it is understood that, this moving objects sorting system 1 of the present invention can be applied to execute an automatic product inspecting and sorting procedure on any kinds of objects. The objects can be agricultural products, mechanical parts, electronic elements/components, semi-finished products, or products.

The above description is made on embodiments of the present invention. However, the embodiments are not intended to limit scope of the present invention, and all equivalent implementations or alterations within the spirit of the present invention still fall within the scope of the present invention.

What is claimed is:

1. A system for sorting moving objects, comprising:
a light source, being disposed near a belt conveyor, and emitting a light to illuminate a plurality of objects moving on the belt conveyor;
a camera, being disposed near the belt conveyor and adjacent to the light source, and being used to capture a plurality of object images of the plurality of objects that are illuminated by the light;
a processor, being electrically connected to the light source and the camera; and
a robot arm, being disposed near the belt conveyor, and being electrically connected to the processor;
wherein the processor comprises a parameter database and an object image database, and further comprising one or more embedded programs including instructions for:
deciding and selecting at least one first setting parameter from the parameter database based on the plurality of object images received from the camera and a plurality of reference object images accessed from the object image database;
adjusting a light color and a light intensity of the light source by using the at least one first setting parameter;
deciding and selecting at least one second setting parameter from the parameter database based on the plurality of object images;
adjusting a focal length, a depth of focus, an exposure value (EV), an angle of view, and/or an angle of coverage of the camera by using the at least one second setting parameter;
deciding an object classifier based on the at least one first setting parameter, the at least one second setting parameter, and the plurality of object images received from the camera, thereby utilizing the object classifier to apply an object classification process to the object images, so as to generate a plurality of classified object images; and
controlling the robot arm to sort the plurality of objects into at least two object group consisting of a normal object group and a defective object group.

2. The system of claim 1, further comprising:
a first collection box, being disposed near an end side of the belt conveyor for collecting a plurality of normal objects sorted out by the robot arm; and
a second collection box, being disposed near an end side of the belt conveyor for collecting a plurality of defective objects sorted out by the robot arm.

3. The system of claim 1, wherein the light source comprises:
a light stand, being electrically connected to the processor; and
a lighting unit, being connected to the light stand, and being electrically connected to the processor;
wherein after light color and the light intensity of the light source are both adjusted by the processor, and the processor further adjusting the light stand, by executing the one or more programs, thereby making the lighting unit provide the light to illuminate the plurality of objects moving on the belt conveyor by an illumination height and an illumination angle.

4. The system of claim 3, wherein the camera comprises:
a camera stand, being electrically connected to the processor, and the camera being supported by the camera stand;
wherein after the focal length, the depth of focus, the exposure value, the angle of view, and/or the angle of coverage of the camera are adjusted by the processor, the processor further adjusting the camera stand, by executing the one or more programs, to make the camera to acquire the plurality of object images from the plurality of objects based on the focal length, the depth of focus, the exposure value (EV), the angle of view, and/or the angle of coverage.

5. The system of claim 1, wherein there is a control unit coupled to the processor and the robot arm, and the control unit is controlled by the processor, so as to drive the robot arm to sort the plurality of objects that are delivered by the belt conveyor into the normal object group and the defective object group.

* * * * *